(12) United States Patent
Ingelbrecht

(10) Patent No.: US 7,151,158 B2
(45) Date of Patent: *Dec. 19, 2006

(54) METHOD OF PREPARING A POLY(ARYLENE ETHER), APPARATUS THEREFOR, AND POLY(ARYLENE ETHER) PREPARED THEREBY

(75) Inventor: Hugo Gerard Eduard Ingelbrecht, Essen (BE)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/769,043

(22) Filed: Jan. 30, 2004

(65) Prior Publication Data

US 2005/0171331 A1 Aug. 4, 2005

(51) Int. Cl.
 C08G 65/38 (2006.01)
 C08G 65/46 (2006.01)
 C08G 65/48 (2006.01)

(52) U.S. Cl. ............... 528/491; 528/493; 528/495; 528/497; 528/498; 528/499; 528/502 R; 528/502 F; 528/503; 526/920

(58) Field of Classification Search ............... 528/491, 528/493, 495, 497, 498, 499, 502 R, 502 F, 528/503; 526/920
See application file for complete search history.

(56) References Cited

U.S. PATENT DOCUMENTS

| 3,789,054 A | 1/1974 | Izawa et al. |
|---|---|---|
| 3,923,738 A | 12/1975 | Van Sorge |
| 4,217,438 A | 8/1980 | Brunelle et al. |
| 4,436,870 A | 3/1984 | Hinselmann et al. |
| 4,788,277 A | 11/1988 | Ibe et al. |
| 4,888,397 A | 12/1989 | van der Meer et al. |
| 6,407,200 B1 | 6/2002 | Singh et al. |
| 6,444,779 B1 | 9/2002 | Singh et al. |
| 6,677,373 B1 | 1/2004 | Calais et al. |
| 6,787,633 B1 * | 9/2004 | Peemans et al. ............ 528/491 |
| 2002/0146456 A1 | 10/2002 | Ramstack et al. |
| 2004/0054121 A1 | 3/2004 | Peemans et al. |

FOREIGN PATENT DOCUMENTS

| EP | 0 549 249 A2 | 4/1994 |
|---|---|---|
| JP | 2003-183385 | 7/2003 |
| JP | 2003-261674 | 9/2003 |
| JP | 2003-313290 | 11/2003 |
| WO | WO 03/000769 | 1/2003 |
| WO | WO 2004/024794 | 3/2004 |

OTHER PUBLICATIONS

Derwent Abstract for JP 2000281773; Oct. 10, 2000; (1 page).
Abstract for EP0135697; Apr. 3, 1985; (1 page).
International Search Report for PCT/US2005/000794. Mailed Apr. 12, 2005.

* cited by examiner

Primary Examiner—Duc Truong
(74) Attorney, Agent, or Firm—Cantor Colburn LLP

(57) ABSTRACT

A method of precipitating a poly(arylene ether) includes combining a poly(arylene ether) solution with an antisolvent at a shear rate of greater than 50,000 sec$^{-1}$. The high shear mixing conditions produce a poly(arylene ether) dispersion in which the poly(arylene ether) solid contains reduced amounts of undesirably fine particles.

32 Claims, 1 Drawing Sheet

METHOD OF PREPARING A POLY(ARYLENE ETHER), APPARATUS THEREFOR, AND POLY(ARYLENE ETHER) PREPARED THEREBY

BACKGROUND

Poly(arylene ether) resins may be prepared by the oxidative polymerization of a monohydric phenol in the presence of a solvent to form a solution in which the product poly(arylene ether) is soluble. The poly(arylene ether) may then be isolated by combining the solution with an antisolvent to precipitate the poly(arylene ether). In practice, it is very challenging to control these precipitations to provide a final poly(arylene ether) solid having consistent particle size. In particular, there is a need for a method of precipitating a poly(arylene ether) that reduces the amount of undesirably fine particles.

BRIEF SUMMARY

The above-described and other drawbacks and disadvantages are alleviated by a method comprising: combining a poly(arylene ether) solution with an antisolvent to form a poly(arylene ether) dispersion comprising a poly(arylene ether) solid; wherein the poly(arylene ether) solution comprises a poly(arylene ether) and a solvent; and wherein said combining comprises mixing with a shear rate of greater than 20,000 reciprocal seconds ($sec^{-1}$).

Other embodiments, including an apparatus for carrying out the method, are described in detail below.

DETAILED DESCRIPTION OF THE PREFERRED EMBODIMENTS

Figure 1:
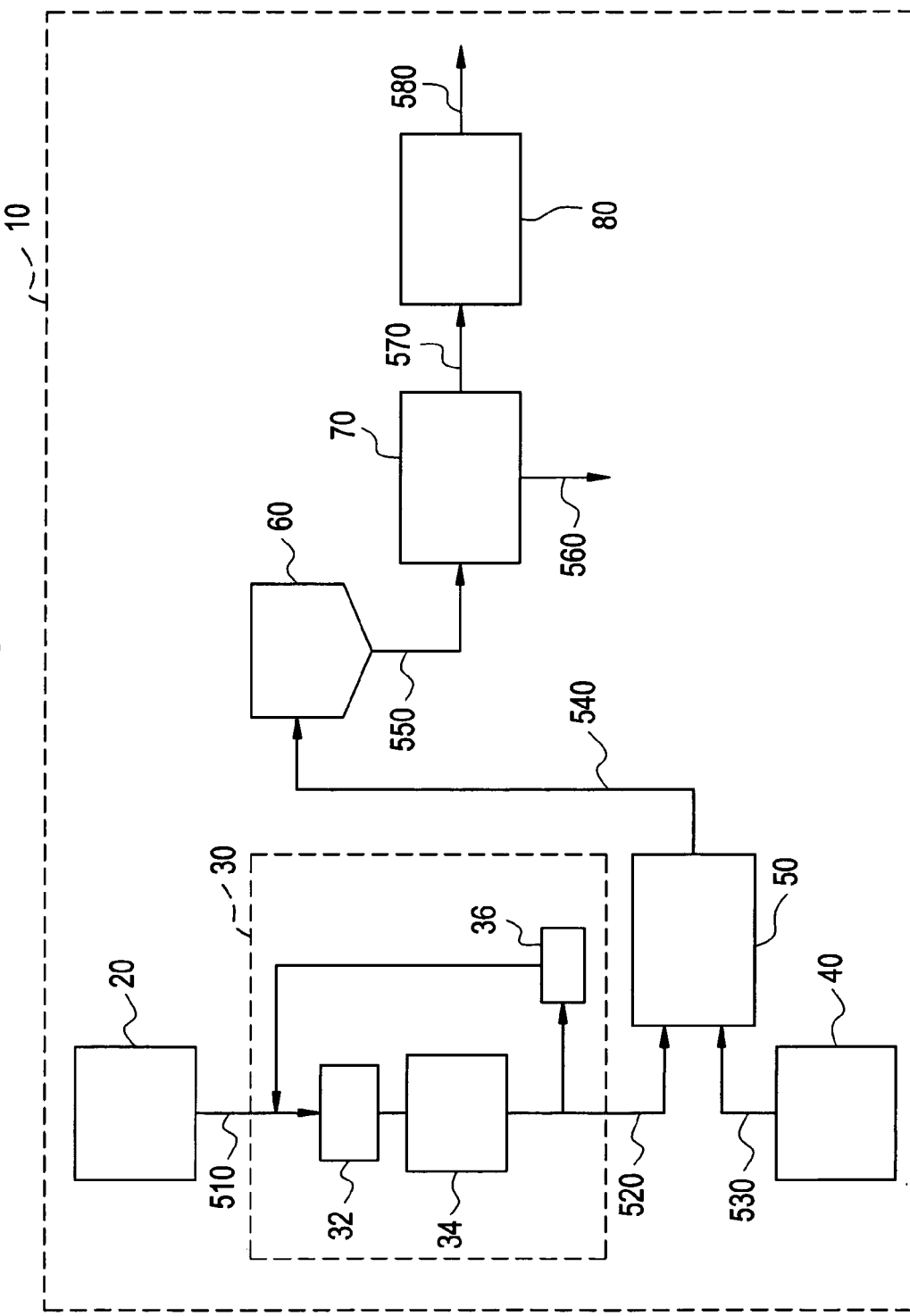
FIG. 1 is a simplified diagrammatic view of a poly (arylene ether) isolation apparatus 10 including a high-shear mixing pump 50 for combining a poly(arylene ether) solution and an antisolvent.

Having extensively studied the precipitation of poly (arylene ether) resins under laboratory-scale, pilot plant, and manufacturing conditions, the present inventors have observed that it can be very difficult to control the precipitation process in order to provide an isolated poly(arylene ether) resin having a low content of particles smaller than 38 micrometers ("fines"). It is desirable to reduce fines because their presence may be associated with losses of the poly (arylene ether) during filtration and drying stages. Other methods may allow the isolation of powders having low content of fines, but they are not readily and economically adaptable to a large-scale manufacturing facility. There remains a need for an economical poly(arylene ether) preparation method that produces poly(arylene ether) powders having a reduced content of fines.

The present inventors have surprisingly found that a poly(arylene ether) precipitate with reduced fines content may be obtained by combining a poly(arylene ether) solution and an antisolvent at a shear rate of greater than 20,000 $sec^{-1}$. This result is particularly surprising because the high shear rate might have been expected to cause particle attribution and therefore undesirably small particle sizes. The shear rate is preferably greater than 50,000 $sec^{-1}$, more preferably at least about 60,000 $sec^{-1}$, still more preferably at least about 75,000 $sec^{-1}$, even more preferably at least about 100,000 $sec^{-1}$, yet more preferably at least about 125,000 $sec^{-1}$. In one embodiment, the shear rate is less than about 500,000 $sec^{-1}$, preferably less than about 350,000 $sec^{-1}$, even more preferably less than about 250,000 $sec^{-1}$. The desired high shear may be achieved using a pump comprising a stator and a rotor. The shear rate may then be defined by the equation $$\text{shear rate} = V \times 1000 / W$$

where shear rate is expressed in units of $sec^{-1}$, V is the circumferential linear velocity of the rotor, in meters per second, and W is the gap width defined by the stator and the rotor, in millimeters. In one embodiment, the stator and the rotor define a gap width of about 0.01 to about 1 millimeter. Within this range, the gap width may preferably be at least about 0.05 millimeter, more preferably at least about 0.10 millimeter. Also within this range, the gap width may preferably be up to about 0.5 millimeter, more preferably up to about 0.25 millimeter. In another embodiment, the rotor has a circumferential linear velocity of about 1 to about 100 meters per second. Within this range, the velocity may preferably be at least about 5 meters per second, more preferably at least about 10 meters per second. Also within this range, the velocity may preferably be up to about 60 meters per second, more preferably up to about 40 meters per second. Apparatus suitable for performing the high-shear combination of the poly(arylene ether) solution and the antisolvent is described, for example, in European Patent No. 135,697 B1 to Schreiber. Suitable apparatus is also commercially available as, for example, the Siefer Trigonal SM 180 centrifugal pump from Wilhelm Siefer GmbH & Co., Velbert, Germany.

There is no particular limit on the ratio in which the poly(arylene ether) solution and the antisolvent are combined. In one embodiment, the poly(arylene ether) solution and the antisolvent are combined in a weight ratio of about 1:1 to about 1:10. Within this range, the ratio may preferably be at least about 1:8, more preferably at least about 1:6. Also within this range, the ratio may preferably be up to about 1:2, more preferably up to about 1:3. In another embodiment, the poly(arylene ether) solution and the antisolvent are combined in a volume ratio of about 1:1 to about 1:10. Within this range, the ratio may preferably be at least about 1:8, more preferably at least about 1:6. Also within this range, the ratio may preferably be up to about 1:2, more preferably up to about 1:3.

The temperatures of the poly(arylene ether) solution and the antisolvent immediately before they are combined will vary according to many factors, including, for example, the poly(arylene ether) composition, the poly(arylene ether) intrinsic viscosity, the poly(arylene ether) concentration in the solution, the solvent type, the antisolvent type, and the weight ratio of poly(arylene ether) solution to antisolvent. In one embodiment, the method comprises combining the poly(arylene ether) at a temperature of about 60 to about 100° C. with the antisolvent at a temperature of about 15 to about 60° C. Within these ranges, the poly(arylene ether) solution temperature may be at least about 70° C., or at least about 80° C.; and the poly(arylene ether) solution temperature may be up to about 95° C., or up to about 90° C. Also within these ranges, the antisolvent temperature may be at least about 20° C., or at least about 25° C.; and the antisolvent temperature may be up to about 55° C., or up to about 50° C. The temperature of the combined poly(arylene ether)-antisolvent mixture may preferably be about 30 to about 55° C.

There is no particular limit on the type of poly(arylene ether) used in the method. The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula

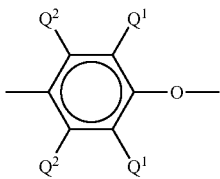

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen. In one embodiment, each $Q^1$ is methyl and each $Q^2$ is hydrogen or methyl. In another embodiment, each $Q^1$ is methyl and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations comprising at least one of the above.

In one embodiment, the poly(arylene ether) is the polymerization product of the at least one monohydric phenol and a dihydric phenol having the structure

wherein D is a divalent aromatic radical. In one embodiment D has the structure

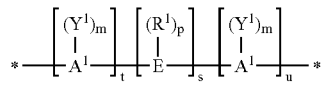

wherein $A^1$ represents an aromatic group such as phenylene, biphenylene, naphthylene, etc. In some embodiments E may be an alkylene or alkylidene group including, for example, methylene, ethylene, ethylidene, propylene, propylidene, isopropylidene, butylene, butylidene, isobutylidene, amylene, amylidene, isoamylidene. When E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage including, but not limited to, sulfide, sulfoxide, sulfone; or a phosphorus-containing linkage including, but not limited to, phosphinyl, phosphonyl. In other embodiments E may be a cycloaliphatic group including, but not limited to, cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene; a sulfur-containing linkage, such as sulfide, sulfoxide or sulfone; a phosphorus-containing linkage, such as phosphinyl or phosphonyl; an ether linkage; a carbonyl group; a tertiary nitrogen group; or a silicon-containing linkage such as silane or siloxy. $R^1$ represents hydrogen or a monovalent hydrocarbon group such as alkyl, aryl, aralkyl, alkaryl, or cycloalkyl. In various embodiments a monovalent hydrocarbon group of $R^1$ may be halogen-substituted, particularly fluoro- or chloro-substituted, for example as in dichloroalkylidene. Each occurrence of $Y^1$ may be an inorganic atom including, but not limited to, halogen (fluorine, bromine, chlorine, iodine); an inorganic group including, but not limited to, nitro; an organic group including, but not limited to, a monovalent hydrocarbon group such as alkyl, aryl, aralkyl, alkaryl, or cycloalkyl, or an oxy group such as $OR^2$, wherein $R^2$ is a monovalent hydrocarbon group such as alkyl, aryl, aralkyl, alkaryl, or cycloalkyl. In some particular embodiments $Y^1$ comprises a halo group or $C_1$–$C_6$ alkyl group. The letter "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

When more than one $Y^1$ substituent is present, they may be the same or different. When more than one $R^1$ substituent is present, they may be the same or different. Where "s" is zero and "u" is not zero, the aromatic rings are directly joined by a covalent bond with no intervening alkylidene or other bridge. The positions of the hydroxyl groups and $Y^1$ on the aromatic residues $A^1$ can be varied in the ortho, meta, or para positions and the groupings can be in vicinal, asymmetrical or symmetrical relationship, where two or more ring carbon atoms of the aromatic residue are substituted with $Y^1$ and hydroxyl groups.

Some illustrative, non-limiting examples of dihydric phenols include the dihydroxy-substituted aromatic hydrocarbons disclosed by name or formula (generic or specific) in U.S. Pat. No. 4,217,438 to Brunelle et al. Suitable dihydric phenols include, for example, 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane; 2,2-bis(4-hydroxyphenyl)propane (commonly known as bisphenol-A); 4,4-bis(4-hydroxyphenyl)heptane; 2,2-bis(4-hydroxy-3,5-dimethylphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,4'-dihydroxydiphenylmethane; bis(2- hydroxyphenyl)methane; bis(4-hydroxy-phenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl)cyclohexylmethane; 2,2-bis(4-hydroxyphenyl)-1-phenylpropane; 3,5,3',5'-tetrachloro-4,4'-dihydroxyphenyl)propane; 2,4'-dihydroxyphenyl sulfone; 2,6-dihydroxy naphthalene; 6,6'-dihydroxy-3,3,3',3'-tetramethyl-1,1'-spirobiindane (sometimes know as "SBI"); hydroquinone; resorcinol; and $C_1$–$C_3$ alkyl-substituted resorcinols. In a particular embodiment the dihydric phenol comprises bisphenol-A. Suitable dihydric phenols also include those containing indane structural units such as, for example, is 3-(4-hydroxyphenyl)-1,1,3-trimethylindan-5-ol, and 1-(4-hydroxyphenyl)-1,3,3-trimethylindan-5-ol.

The poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials. The method may, optionally, further comprise preparing the poly(arylene ether).

Particularly useful poly(arylene ether)s for many purposes are those that comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

There is no particular limit on the intrinsic viscosity of the poly(arylene ether). For example, the poly(arylene ether) may have an intrinsic viscosity measured at 25° C. in chloroform of about 0.05 to about 1.0 deciliters per gram (dL/g). Within the range, the intrinsic viscosity may be at least about 0.1, 0.2, 0.3, or 0.35 dL/g. Also within this range, the intrinsic viscosity may be up to about 0.8, 0.65, or 0.5 dL/g. The method is particularly useful for controlling the precipitation of low intrinsic viscosity poly(arylene ether) resins. Thus, in one embodiment, the poly(arylene ether) has an intrinsic viscosity of about 0.05 dL/g to about 0.3 dL/g. In another embodiment, the poly(arylene ether) comprises about 90 to about 99.9 weight percent of a first poly(arylene ether) having an intrinsic viscosity of about 0.05 to 0.3 deciliters per gram and about 0.1 to about 10 weight percent of a second poly(arylene ether) having an intrinsic viscosity of greater than 0.3 to about 1.0 deciliters per gram.

The poly(arylene solution) may comprise any concentration of poly(arylene ether). For example, the poly(arylene ether) solution may comprise about 10 to about 70 weight percent of the poly(arylene ether), based on the total weight of the poly(arylene ether) solution. Within this range, the poly(arylene ether) concentration may be at least about 20 weight percent, or at least about 40 weight percent. Also within this range, the poly(arylene ether) concentration may be up to about 60 weight percent, or up to about 50 weight percent. The optimum poly(arylene ether) concentration will depend on variables including the poly(arylene ether) composition, the poly(arylene ether) intrinsic viscosity, and the identity of the solvent.

There is no particular limit on the solvent employed in the method. Suitable organic solvents include aliphatic alcohols, ketones, aliphatic and aromatic hydrocarbons, chlorohydrocarbons, nitrohydrocarbons, ethers, esters, amides, mixed ether-esters, sulfoxides, and the like, and combinations thereof. In a preferred embodiment, the solvent comprises a $C_6$–$C_{18}$ aromatic hydrocarbon, including, for example, toluene, xylenes, and the like, and mixtures thereof. A highly preferred solvent is toluene.

In one embodiment, the solvent comprises, based on the total weight of the solvent, about 70 to about 99.9 weight percent of a $C_6$–$C_{18}$ aromatic hydrocarbon, and about 0.1 to about 30 weight percent of a poor solvent such as, for example, a $C_1$–$C_{10}$ alkanol, a $C_3$–$C_{10}$ ketone, a $C_5$–$C_{10}$ alkane, or the like, or a mixture thereof. In one embodiment, the poor solvent comprises a $C_3$–$C_8$ aliphatic alcohol such as, for example, n-propanol, isopropanol, n-butanol, t-butanol, n-pentanol, or the like, or a combination thereof. A preferred $C_3$–$C_8$ aliphatic alcohol is n-butanol. In one embodiment, the solvent comprises a $C_6C_{18}$ aromatic hydrocarbon; a $C_3$–$C_8$ aliphatic alcohol; and methanol and/or ethanol, which acts as an antisolvent for the poly(arylene ether). The $C_6$–$C_{18}$ aromatic hydrocarbon, the $C_3$–$C_8$ aliphatic alcohol, and the methanol or ethanol may be combined in any proportion, but it may be preferred that the solvent comprise at least about 50 weight percent of the $C_6$–$C_{18}$ aromatic hydrocarbon.

In another embodiment, the solvent is substantially free of any $C_1$–$C_6$ alkanol. By substantially free, it is meant that the solvent comprises less than about 0.1 weight percent of a $C_1$–$C_6$ alkanol. In this embodiment, it is preferred that the solvent comprises no intentionally added $C_1$–$C_6$ alkanol.

The poly(arylene ether) solution is preferably a homogeneous solution. In other words, the poly(arylene ether) solution is preferably free of undissolved solid particles, especially particles having any dimension greater than 1 micrometer. In one embodiment, the poly(arylene ether) solution does not exhibit a cloud point when cooled. For example, as solutions of poly(2,6-dimethyl-1,4-phenylene ether) in toluene are concentrated, they may form a gelatinous phase without the discrete solid particles characteristic of a cloud point. A method of determining the cloud point of a poly(arylene ether) solution (and therefore of determining whether a poly(arylene ether) exhibits such a cloud point) is described in U.S. Pat. No. 6,444,779 to Singh et al.

There is no particular limit on the antisolvent employed in the method. Suitable antisolvents include lower alkanols having one to about ten carbon atoms, such as methanol, and the like; ketones having three to about ten carbon atoms, such as acetone, and the like; and alkanes having five to about ten carbon atoms, such as hexane; and the like; and combinations thereof. A preferred antisolvent comprises methanol, ethanol, n-propanol, isopropanol, n-butanol, isobutanol, t-butanol, or the like, or a mixture thereof. In one embodiment the antisolvent comprises methanol and at least one $C_3$–$C_6$ alkanol. Suitable $C_3$–$C_6$ alkanols include, for example, n-propanol, isopropanol, n-butanol, isobutanol, t-butanol, n-pentanol, 2-methyl-1-butanol, 2-methyl-2-butanol, 3-methyl-1-butanol, 3-methyl-2-butanol, 2,2-dimethyl-1-propanol (neopentyl alcohol), cyclopentanol, 1-hexanol, 2-hexanol, 3-hexanol, 2-methyl-1-pentanol, 2-methyl-2-pentanol, 2-methyl-3-pentanol, 4-methyl-i-pentanol, 4-methyl-2-pentanol, 3-methyl-1-pentanol, 3-methyl-2-pentanol, 3-methyl-3-pentanol, 2-ethyl-1-butanol, 2,3-dimethyl-1-butanol, 2,3-dimethyl-2-butanol, 2,2-dimethyl-1-butanol, 3,3-dimethyl-1-butanol, 3,3-dimethyl-2-butanol, cyclopentylmethanol, 1-methylcyclopentanol, 2-methylcyclopentanol, 3-methylcyclopentanol, cyclohexanol, and the like, and mixtures thereof. In another embodiment, the antisolvent comprises (a) methanol, and (b) isopropanol, n-butanol, or a mixture thereof. A highly preferred antisolvent comprises methanol.

In another embodiment, the antisolvent comprises about 60 to 99.8 weight percent methanol, 0.1 to about 30 weight percent toluene, and 0.1 to about 10 weight percent water. Preferably, the antisolvent comprises about 70 to about 90 weight methanol, about 5 to about 30 weight percent toluene, and about 1 to about 6 weight percent water. More preferably, the antisolvent comprises about 75 to about 85 weight percent methanol, about 15 to about 25 weight percent toluene, and about 1.5 to about 5 weight percent water.

The temperatures of the poly(arylene ether) solution and the antisolvent immediately before they are combined will vary according to many factors, including, for example, the poly(arylene ether) composition, the poly(arylene ether) intrinsic viscosity, the poly(arylene ether) concentration in the solution, the solvent type, the antisolvent type, and the weight ratio of poly(arylene ether) solution to antisolvent. In one embodiment, the method comprises combining the poly(arylene ether) at a temperature of about 60 to about 100° C. with the antisolvent at a temperature of about 15 to about 60° C. Within these ranges, the poly(arylene ether) solution temperature may be at least about 70° C., or at least about 80° C.; and the poly(arylene ether) solution temperature may be up to about 95° C., or up to about 90° C. Also within these ranges, the antisolvent temperature may be at least about 20° C., or at least about 25° C.; and the antisolvent temperature may be up to about 55° C., or up to about 50° C. The temperature of the combined poly(arylene ether)-antisolvent mixture may preferably be about 30 to about 55° C.

In another embodiment, the method may, optionally, further comprise concentrating the poly(arylene ether) solution prior to the combining the poly(arylene ether) solution with the antisolvent. In one embodiment, concentrating the poly(arylene ether) solution is conducted in a continuous process section comprising a heat exchanger, a flash unit, and a circulation pump. Optionally, part of the concentrated solution product discharged from the flash unit may be recycled to the inlet of the heat exchanger. In one embodiment, the flash unit is operated at a pressure less than one atmosphere, and the temperature of the poly(arylene solution) in the heat exchanger is greater than the boiling point of the solvent at the actual pressure in the flash unit. In this embodiment, the lower pressure in the flash unit results in adiabatic flashing of part of the solvent. Preconcentrating the poly(arylene ether) solution may comprise maintaining a flash vessel at a pressure, P, heating the poly(arylene ether) solution to a temperature, T, above the boiling point of the solvent at pressure P, introducing the heated poly(arylene ether) solution to the flash vessel to evaporate a portion of the solvent and form a concentrated poly(arylene ether) solution, and recirculating a portion of the concentrated poly(arylene ether) solution to a point upstream of the flash vessel.

Combining the poly(arylene ether) solution with the antisolvent forms a poly(arylene ether) dispersion. The method may, optionally, further comprise separating the poly(arylene ether) solid from the poly(arylene ether) dispersion. In one embodiment, separating the poly(arylene ether) solid from the poly(arylene ether) dispersion comprises filtration. In another embodiment, separating the poly(arylene ether) solid from the poly(arylene ether) dispersion comprises centrifugation. Suitable filtration apparatuses include rotating filters, continuous rotary vacuum filters, continuous moving bed filters, batch filters, and the like. Suitable solid/liquid separation apparatuses include continuous solid/liquid centrifuges.

The method allows control of the particle size distribution of the isolated poly(arylene ether) solid. The desired particle size distribution may vary as a function of, for example, the poly(arylene ether) composition and intrinsic viscosity. In one embodiment, the isolated poly(arylene ether) solid has a number-average mean particle size of about 200 micrometers to about 1,000 micrometers. Within this range, the mean particle size may be at least about 300 micrometers. Also within this range, the mean particle size may be up to about 900 micrometers, or up to about 800 micrometers, or up to about 700 micrometers.

The method may, optionally, further comprise treating the poly(arylene ether) with a functionalizing agent comprising (a) at least one carbon-carbon double bond or carbon-carbon triple bond and (b) at least one functional group selected from carboxylic acid, acid anhydride, acid amide, imide, ester, amino, hydroxy, and the like. Suitable functionalizing agents include, for example, maleic acid, fumaric acid, maleic anhydride, maleimides such as N-phenylmaleimide and 1,4-phenylene-bis-methylene-α,α'-bismaleimide, maleic hydrazide, methylnadic anhydride, fatty oils (e.g., soybean oil, tung oil, linseed oil, sesame oil), unsaturated carboxylic acids such as acrylic acid, crotonic acid, methacrylic acid and oleic acid, unsaturated alcohols such as allyl alcohol and crotyl alcohol, and unsaturated amines such as allylamine. A preferred functionalizing agent comprises maleic anhydride. In one embodiment, the poly(arylene ether) is treated with the functionalizing agent in solution or slurry prior to precipitation. In another embodiment, an isolated poly(arylene ether) may be treated with a gaseous functionalizing agent. Other functionalizing agents, as well as functionalizing methods, are described, for example, in U.S. Pat. No. 4,888,397 to van der Meer et al., and Japanese Patent Publication No. 2003-183385 to Tokiwa et al.

One embodiment is a method of precipitating a poly(arylene ether), comprising: combining a poly(arylene ether) solution with an antisolvent to form a poly(arylene ether) dispersion comprising a poly(arylene ether) solid; wherein the antisolvent comprises an alkanol having one to about ten carbon atoms; wherein the poly(arylene ether) solution comprises a poly(arylene ether) and a solvent; wherein the poly(arylene ether) comprises a poly(2,6-dimethyl-1,4-phenylene ether), a poly(2,6-dimethyl-1,4-phenylene ether-co-2,3,6-trimethyl-1,4-phenylene ether), or a mixture thereof; wherein the solvent comprises a $C_6$–$C_{18}$ aromatic hydrocarbon; and wherein said combining comprises mixing with a shear rate of greater than 60,000 $sec^{-1}$.

Another embodiment is a method of precipitating a poly(arylene ether), comprising: combining a poly(arylene ether) solution with an antisolvent to form a poly(arylene ether) dispersion comprising a poly(arylene ether) solid; wherein the antisolvent comprises methanol; wherein the poly(arylene ether) solution comprises a poly(arylene ether) and a solvent; wherein the poly(arylene ether) comprises a poly(2,6-dimethyl-1,4-phenylene ether) having an intrinsic viscosity of about 0.05 to about 0.3 deciliters/gram at 25° C.

in chloroform; wherein the solvent comprises toluene; and wherein said combining comprises mixing with a shear rate of greater than 75,000 sec$^{-1}$.

Another embodiment is a poly(arylene ether) prepared by any of the above methods. In one embodiment, the isolated poly(arylene ether) comprises less that 10 weight percent, preferably less than 5 weight percent, more preferably less than 2 weight percent, of particles smaller than 38 micrometers. It will be understood that "smaller than 38 micrometers" refers to an equivalent spherical diameter less than 38 micrometers. One advantage of the invention is that poly (arylene ether) solids prepared by the method exhibit improved flow properties. For example, the poly(arylene ether) may exhibit a flowability value of about 70 to 100. Within the range of about 70 to 100, the flowability value may preferably be at least about 75, more preferably at least about 82. Flowability may be determined by measuring percent compressibility. Percent compressibility, % C, is determined according to the equation $$\% \ C = \frac{PBD - ABD}{PBD} \times 100$$

where PBD is the packed bulk density and ABD is the aerated bulk density. Compressibility may be measured with commercially available instrumentation, such as, for example, a Hosakawa powder testing device available from Hosokawa Micron Powder Systems, 10 Chatham Road Summit, N.J. 07901, U.S. There is an inverse correlation between percent compressibility values and flowability values, as shown in Table 1, below. In Table 1, percent compressibility is abbreviated "Comp", and flowability is abbreviated "Flow". Thus, preferred percent compressibility values are 0 to about 20, preferably 0 to about 17.5, more preferably 0 to about 14.

TABLE 1

| Comp | Flow |
|---|---|
| 0.0 | 100 |
| 1.0 | 100 |
| 2.0 | 100 |
| 3.0 | 100 |
| 4.0 | 100 |
| 5.0 | 100 |
| 6.0 | 98 |
| 6.5 | 97 |
| 7.0 | 96 |
| 7.5 | 95 |
| 8.0 | 94 |
| 8.5 | 93 |
| 9.0 | 92 |
| 9.5 | 91 |
| 10.0 | 90 |
| 10.5 | 89 |
| 11.0 | 88 |
| 11.5 | 87 |
| 12.0 | 86 |
| 12.5 | 85 |
| 13.0 | 84 |
| 13.5 | 83 |
| 14.0 | 82 |
| 14.5 | 81 |
| 15.0 | 80 |
| 15.5 | 79 |
| 16.0 | 78 |
| 16.5 | 77 |
| 17.0 | 76 |
| 17.5 | 75 |

TABLE 1-continued

| Comp | Flow |
|---|---|
| 18.0 | 74 |
| 18.5 | 73 |
| 19.0 | 72 |
| 19.5 | 71 |
| 20.0 | 70 |
| 20.5 | 69 |
| 21.0 | 68 |
| 21.5 | 67 |
| 22.0 | 66 |
| 22.5 | 65 |
| 23.0 | 64 |
| 23.5 | 63 |
| 24.0 | 62 |
| 24.5 | 61 |
| 25.0 | 60 |
| 25.5 | 59 |
| 26.0 | 58 |
| 26.4 | 57 |
| 26.7 | 56 |
| 27.0 | 55 |
| 27.2 | 54 |
| 27.5 | 53 |
| 28.0 | 52 |
| 28.2 | 51 |
| 28.5 | 50 |
| 28.8 | 49 |
| 29.0 | 48 |
| 29.4 | 47 |
| 29.7 | 46 |
| 30.0 | 45 |
| 30.2 | 44 |
| 30.5 | 43 |
| 30.8 | 42 |
| 31.0 | 41 |
| 31.4 | 40 |
| 31.7 | 39 |
| 32.0 | 38 |
| 32.2 | 37 |
| 32.5 | 36 |
| 32.8 | 35 |
| 33.0 | 34 |
| 33.4 | 33 |
| 33.7 | 32 |
| 34.0 | 31 |
| 34.2 | 30 |
| 34.5 | 29 |
| 34.8 | 28 |
| 35.0 | 27 |
| 35.4 | 26 |
| 35.7 | 25 |
| 36.0 | 24 |
| 36.2 | 23 |
| 36.5 | 22 |
| 36.8 | 21 |
| 37.0 | 20 |
| 37.5 | 19 |
| 38.0 | 18 |
| 38.5 | 17 |
| 39.0 | 16 |
| 39.5 | 15 |
| 40.0 | 14 |
| 40.5 | 13 |
| 41.0 | 12 |
| 41.5 | 11 |
| 42.0 | 10 |
| 42.5 | 9 |
| 43.0 | 8 |
| 43.5 | 7 |
| 44.0 | 6 |
| 45.0 | 5 |
| 46.0 | <5 |

One embodiment is an apparatus for preparing a poly (arylene ether), comprising: means for preparing a poly (arylene ether) solution comprising a poly(arylene ether) and a solvent; means for combining the poly(arylene ether)

solution and an antisolvent at a shear rate of greater than 50,000 sec$^{-1}$ to form a poly(arylene ether) dispersion comprising a poly(arylene ether) solid; and means for separating the poly(arylene ether) solid from the poly(arylene ether) dispersion to form an isolated poly(arylene ether) solid. The poly(arylene ether) solution may be prepared by polymerizing a monohydric phenol in a solvent. Alternatively, the poly(arylene ether) solution may be prepared by dissolving a previously isolated poly(arylene ether) in a solvent. FIG. 1 illustrates one embodiment of a poly(arylene ether) isolation apparatus 10. Optional reactor 20 is used to polymerize a monohydric phenol in solvent to form a poly(arylene ether) solution 510. The poly(arylene ether) solution 510 is then concentrated by solvent removal in optional preconcentration unit 30 to form a concentrated poly(arylene ether) solution 520. The preconcentration unit 30 may comprise a heat exchanger 32, a flash evaporation unit 34, and a recirculation pump 36. Antisolvent 530, from antisolvent reservoir 40, is combined with the concentrated poly(arylene ether) solution 520 in high-shear mixing pump 50 to form poly(arylene ether) dispersion 540. The poly(arylene ether) dispersion 540 is pumped to an optional precipitation tank 60 where it is stirred and released as aged poly(arylene ether) dispersion 550. The aged poly(arylene ether) dispersion 550 is separated by optional centrifuge 70 into combined solvent and antisolvent 560 and poly(arylene ether) solid 570. The poly(arylene ether) solid 570 conveyed to optional drier 80, which produces dried poly(arylene ether) solid 580.

The invention is further illustrated by the following non-limiting examples.

EXAMPLE 1

COMPARATIVE EXAMPLE 1

A solution of 38 weight percent poly(2,6-dimethyl-1,4-phenylene ether) in toluene was prepared. The poly(2,6-dimethyl-1,4-phenylene ether) had an intrinsic viscosity of 0.46 deciliters/gram in toluene at 25° C. The solution, at a temperature of 82° C., was combined with antisolvent consisting of 78% methanol, 19% toluene and 3% water at a temperature of 30° C., in a volume ratio of 1:5, respectively. For Example 1, the solution and the antisolvent were combined using a high shear pump characterized by a shear rate of 180,000 sec$^{-1}$, a stator-rotor gap width of 0.15 millimeters, and a circumferential linear velocity of 27 meter/second. For Comparative Example 2, the solution and antisolvent were combined in a stirred tank with an agitator having a rotation rate of 130 rpm and an energy input about forty times less than that of the high shear pump of 130. The precipitates thus obtained were filtered, dried, and characterized by particle size analysis using a Malvern PSD (particle size distribution) analyzer, which uses a laser light dispersion technique to determine the weight percent of particles smaller than 38 micrometers. The results, presented in Table 2, show that the Example 1 precipitate had a substantially lower content of "fines" than did the Comparative Example.

TABLE 2

|  | Ex. 1 | C. Ex. 1 |
| --- | --- | --- |
| weight percent of particles <38 micrometers | 4.1 | 12.1 |

EXAMPLE 2

COMPARATIVE EXAMPLE 2

The procedure of Example 1 and Comparative Example 1 was repeated, except that the intrinsic viscosity of the poly(2,6-dimethyl-1,4-phenylene ether) was 0.40 deciliters/gram, and the poly(arylene ether) solution contained 42% of poly(2,6-dimethyl-1,4-phenylene ether). The results, presented in Table 3, again show that high shear mixing produces an isolated poly(arylene ether) having a reduced content of undesirably small particles.

TABLE 3

|  | Ex. 1 | C. Ex. 2 |
| --- | --- | --- |
| weight percent of particles <38 micrometers | 2.6 | 10.7 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A method of precipitating a poly(arylene ether), comprising:
    combining a poly(arylene ether) solution with an antisolvent to form a poly(arylene ether) dispersion comprising a poly(arylene ether) solid;
    wherein the poly(arylene ether) solution comprises a poly(arylene ether) and a solvent; and
    wherein said combining comprises mixing with a shear rate greater than 50,000 to about 500,000 sec$^{-1}$.

2. The method of claim 1, wherein the shear rate is about 60,000 to about 500,000 sec$^{-1}$.

3. The method of claim 1, wherein said combining comprises mixing with a pump comprising a stator and a rotor.

4. The method of claim 3, wherein the stator and the rotor define a gap width of about 0.01 to about 1 millimeter.

5. The meted of claim 3, wherein the rotor has a circumferential linear velocity of about 1 to about 100 meters per second.

6. The method of claim 1, wherein said combining is characterized by a volume ratio of the poly(arylene ether) solution to the antisolvent of about 1:1 to about 1:10.

7. The method of claim 1, wherein said combining comprises combining the poly(arylene ether) solution at a temperature of about 70 to about 100° C. with the antisolvent at a temperature of about 15 to about 60° C.

8. The method of claim 1, wherein the antisolvent comprises a compound selected from alkanols having one to about ten carbon atoms, ketones having three to about ten carbon atoms, alkanes having five to about ten carbon atoms, and combinations thereof.

9. The method of claim 1, wherein the antisolvent comprises an alkanol having one to about ten carbon atoms.

10. The method of claim 1, wherein the antisolvent comprises about 60 to 99.8 weight percent methanol, 0.1 about 35 weight percent toluene, and 0.1 to about 10 weight percent water.

11. The method of claim 1, wherein the antisolvent comprises
(a) methanol, and
(b) isopropanol, n-butanol, or a mixture thereof.

12. The method of claim 1, wherein the poly(arylene ether) comprises a plurality of structural units of the formula

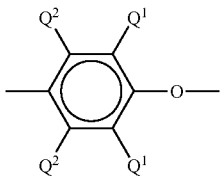

wherein for each structural vnit, each $Q^1$ is independently selected front halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy wherein at least two carbon atoms separate the halogen and oxygen atoms; and each $Q^2$ is independently selected from hydrogen, halogen, $C_1$–$C_7$ primary or secondary alkyl, phenyl, $C_1$–$C_7$ haloalkyl, $C_1$–$C_7$ hydrocarbonoxy, and $C_2$–$C_7$ halohydrocarbonoxy wherein at least two carbon atoms separate the halogen and oxygen atoms.

13. The method of claim 12, wherein each $Q^1$ is methyl and each $Q^2$ is hydrogen or methyl.

14. The method of claim 12, wherein each $Q^1$ is methyl and each $Q^2$ is hydrogen.

15. The method of claim 12, wherein the poly(arylene ether) is the polymerization product of the at least one monohydric phenol and a dihydric phenol having the structure

wherein D is a divalent aromatic radical.

16. The method of claim 1, wherein the poly(arylene ether) comprises a first poly(arylene ether) having an intrinsic viscosity of about 0.05 to 0.3 deciliter per gram, measured at 25° C. in chloroform.

17. The method of claim 16, wherein the poly(arylene ether) further comprises about 0.1 to about 10 weight percent of a second poly(arylene ether) having an intrinsic viscosity of greater than 0.3 to about 1.0 deciliter per gram, measured at 25° C. in chloroform.

18. The method of claim 1, wherein the poly(arylene ether) comprises a first poly(arylene ether) having an intrinsic viscosity of about 0.3 to 0.6 deciliter per gram, measured at 25° C. in chloroform.

19. The method of claim 1, wherein the solvent comprises a $C6$–$C_{18}$, aromatic hydrocarbon.

20. The method of claim 1, wherein the solvent comprises about 70 to about 99.9 weight percent of a $C_6$–$C_{18}$ aromatic hydrocarbon; and
about 0.1 to about 30 weight percent of a poor solvent selected from $C_1$–$C_{10}$ alkanols, $C_3$–$C_{10}$ ketones, $C_5$–$C_{10}$ alkanes, and mixtures thereof.

21. The method of claim 1, wherein the poly(arylene ether) solution comprises about 10 to about 70 weight percent of the poly(arylene ether), based on the total weight of the poly(arylene ether) solution.

22. The method of claim 1, wherein the poly(arylene ether) solution does not exhibit a cloud point.

23. The method of claim 1, further comprising isolating the precipitated poly(arylene ether) and treating the isolated poly(arylene ether) with a functionalizing agent comprising (a) at least one carbon-carbon double bond or carbon-carbon triple bond and (b) at least one functional group selected from carboxylic acid, acid anhydride, acid amide, imide, ester, amino, and hydroxy.

24. The method of claim 23, wherein the functionalizing agent comprises maleic anhydride.

25. The method of claim 23, wherein said treating the isolated poly(arylene ether) with the functionalizing agent comprises treating a powdered poly(arylene ether) with a gaseous funetionalizing agent.

26. The method of claim 1, further comprising preconcentrating the poly(arylene ether) solution.

27. The method of claim 26, wherein preconcentrating the poly(arylene ether) solution comprises maintaining a flash vessel at a pressure, P, heating the poly(arylene ether) solution to a temperature, T, above the boiling point of the solvent at pressure P, introducing the heated poly(arylene ether) solution to the flash vessel to evaporate a portion of the solvent and form a concentrated poly(arylene ether) solution, and recirculating a portion of the concentrated poly(arylene ether) solution to a point upstream of the flash vessel.

28. A method of precipitating a poly(arylene ether), comprising:
combining a poly(arylene ether) solution with an antisolvent to form a poly(arylene ether) dispersion comprising a poly(arylene ether) solid;
wherein the antisolvent comprises an alkanol having one to about ten carbon atoms;
wherein the poly(arylene ether) solution comprises a poly(arylene ether) and a solvent;
wherein the poly(arylene ether) comprises a poly(2,6-dimethyl-1,4-phenylene ether), a poly(2,6-dimethyl-1,4-phenylene ether-co-2,3,6-trimethyl-1,4-phenylene ether), or a mixture thereof;
wherein the solvent comprises a $C_6$–$C_{18}$ aromatic hydrocarbon; and
wherein said comnbining comprises mixing with a shear rate of about 60,000 to about 500,000 sec$^{-1}$.

29. The method of claim 28, wherein the solvent comprises about 70 to about 99.9 weight percent of a $C_6$–$C_{18}$ is aromatic hydrocarbon; and about 0.1 to about 30 weight percent of a poor solvent selected from $C_1$–$C_{10}$ alkanols, $C_3$–$C_{10}$ ketones, $C_5$–$C_{10}$ alkanes, and mixtures thereof.

30. A method of precipitating a poly(arylene ether), comprising:
combining a poly(arylene ether) solution with an antisolvent to form a poly(arylene ether) dispersion comprising a poly(arylene ether) solid;
wherein the antisolvent comprises methanol;
wherein the poly(arylene ether) solution comprises a poly(arylene ether) and a solvent;
wherein the poly(arylene ether) comprises apoly(2,6-dimethyl-1,4-phenylene ether) having an intrinsic viscosity of about 0.05 to about 0.3 deciliters/gram at 25° C. in chloroform;
wherein the solvent comprises toluene; and
wherein said combining comprises mixing with a shear rate of about 75,000 to about 500,000 sec$^{-1}$.

31. A method of precipitating a poly(arylene ether), comprising:

combining a poly(arylene ether) solution with an antisolvent to form a poly(arylene ether) dispersion comprising a poly(arylene ether) solid;
wherein the antisolvent comprises methanol;
wherein the poly(arylene ether) solution comprises a poly(arylene ether) and a solvent;
wherein the poly(arylene ether) comprises a poly(2,6-dimethyl-1,4-phenylene ether) having an intrinsic viscosity of about 0.3 to about 0.7 deciliters/gram at 25° C. in chloroform;
wherein the solvent comprises toluene; and
wherein said combining comprises mixing with a shear rate of about 75,000 to about 500,000 sec$^{-1}$.

32. A method of precipitating a poly(arylene ether), comprising:
combining a poly(arylene ether) solution with an antisolvent to form a poly(arylene ether) dispersion comprising a poly(arylene ether) solid;
wherein the poly(arylene ether) solution comprises a poly(arylene ether) and a solvent;
wherein the poly(arylene ether) solution does not exhibit a cloud point; and
wherein said combining comprises mixing with a shear rate of about 20,000 to about 500,000 sec$^{-1}$.

* * * * *